Figure 1:
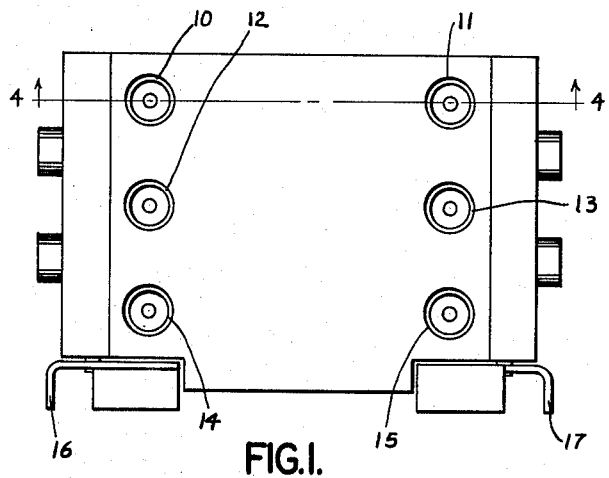

Dec. 15, 1964  P. I. EVANS  3,161,399
STOP VALVE MECHANISM
Filed Sept. 19, 1961  2 Sheets-Sheet 1

INVENTOR.
PAUL I. EVANS
BY S. J. Rotondi, Jr.;
A. J. Dupont & H. R. Johns
ATTORNEYS:

Dec. 15, 1964  P. I. EVANS  3,161,399
STOP VALVE MECHANISM
Filed Sept. 19, 1961  2 Sheets-Sheet 2

INVENTOR.
PAUL I. EVANS
BY S. J. Rotondi,
a. J. Dupont & H. R. Johns
ATTORNEYS:

United States Patent Office 3,161,399
Patented Dec. 15, 1964

3,161,399
STOP VALVE MECHANISM
Paul I. Evans, Livermore, Calif., assignor to the United States of America as represented by the Secretary of the Army
Filed Sept. 19, 1961, Ser. No. 139,828
2 Claims. (Cl. 251—14)

The invention described herein may be manufactured and used by or for the Government for governmental purposes without the payment to me of any royalty thereon.

This application is a continuation-in-part of my application Serial No. 797,827, filed March 5, 1959, for "Stop Valve Mechanisms" and now abandoned.

The invention disclosed by these applications relates to valve mechanisms for controlling the flow of fluids, and more particularly to an improved valve mechanism which operates automatically to interrupt the flow of a fluid in response to a decrease of the fluid pressure in its outlet circuit.

An outstanding feature of this improved valve mechanism is its ability to function as a hydraulic fuse whereby the loss of fluid otherwise occasioned by damage to the operated device or its supply conduit is prevented. As applied to a system where a plurality of devices are operated from the same fluid pressure source it has the important advantage that it automatically isolates a defective device, thus preventing undue loss of operating fluid and allowing uninterrupted operation of the remaining devices.

Briefly stated, the present invention involves a valve located in the main path of the operating fluid and biased to a closed position. In shunt to the main path is a path which opens into the main path at the opposite sides of the valve. A piston arranged to move in this shunt path is biased to one position and is moved to another position in response to the presence of a fluid pressure at the valve inlet. As a result of this movement, fluid is expelled from the shunt path and there is built up at the valve outlet a liquid pressure whereby the valve is opened. When this happens, the piston returns to its original position. The loss of this liquid pressure by rupture of the output conduit or otherwise results in automatic closure of the valve due to the reduced pressure at its outlet.

The invention will be better understood from the following description when considered in connection with the accompanying drawings and its scope is indicated by the appended claims.

Figure 2:
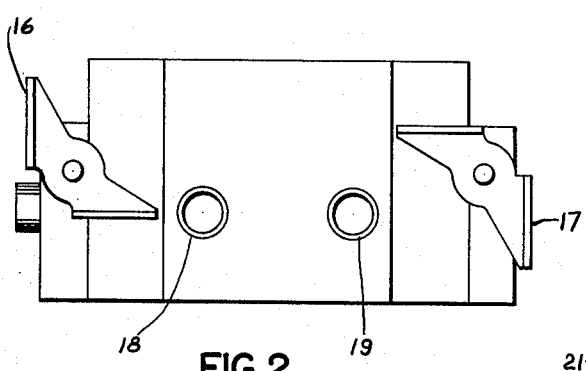
Figure 3:
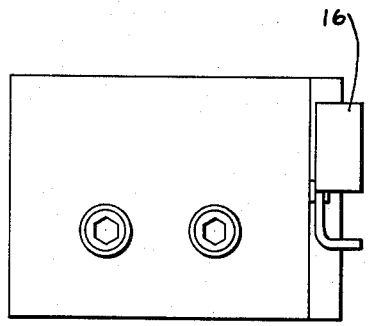
Figure 5:
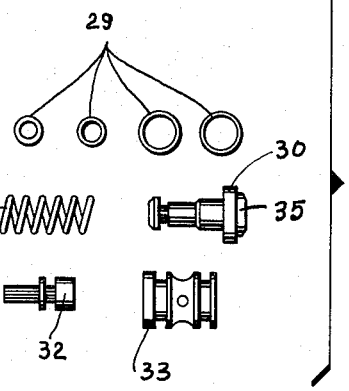
Figure 4:
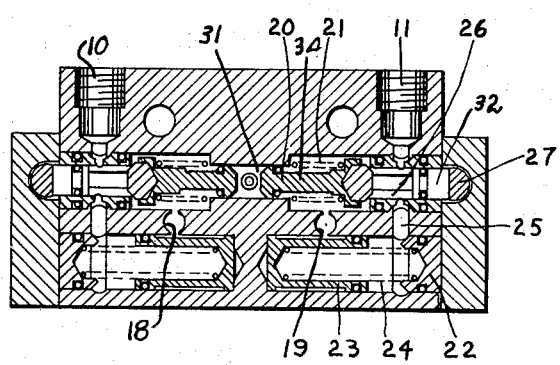
Figure 6:
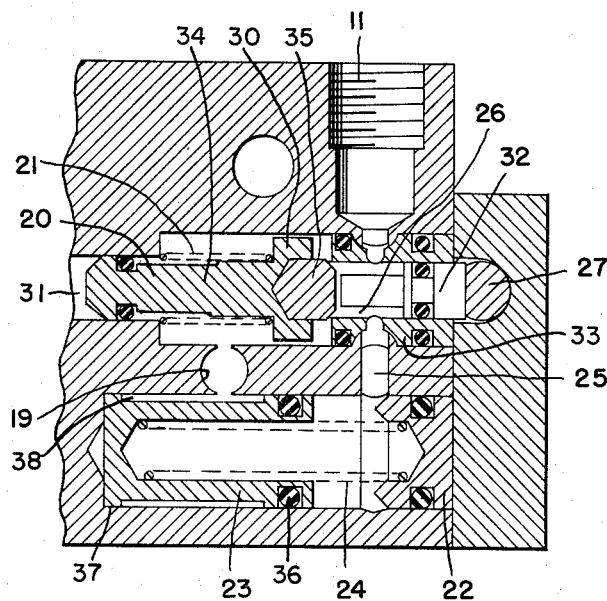

Referring to the drawings:

FIG. 1 is a top view of a valve mechanism assembly including six stop valves each adapted to control the supply of operating fluid to a different device, FIG. 2 is a side view of the valve mechanism, FIG. 3 is a left end view of the valve mechanism, FIG. 4 is a section taken on the line 4—4 of FIG. 1, FIG. 5 is an exploded view of a check valve, and FIG. 6 is an enlargement of one of the two valves illustrated by FIG. 4.

The valve mechanism of FIG. 1 includes six valve outlets 10 to 15, each adapted to be connected to a different fluid pressure operated device. Control elements 16 and 17 are provided for manually operating means whereby the stop valves are by-passed to bleed the system of air as hereinafter explained. Operating fluid is supplied to the mechanism through the valve inlets 18 and 19 (see FIG. 2).

As indicated by FIG. 6, the head 35 of a valve 20, interposed between the inlet 19 and the valve seat 33 leading to outlet 11, is normally biased to its closed position by a spring 21 of predetermined design characteristics including a force barely sufficient to close head 35 upon its seat 33 when the fluid pressure at the outlet side 26 of valve seat 33 falls below a predetermined delivery fluid pressure acting upon the various effective areas adjacent the valve stem 34, coupled with a substantially atmospheric or other predetermined pressure condition in chamber 31 behind the valve stem. This pressure differential on the stem or inlet side of the head 35 cooperates with the spring 21 to maintain the valve in its illustrated closed position. When the valve is opened by a force applied through the chamber 26, however, the liquid surrounding the stem 34 flows past the head 35 into the chamber 26, and the predominating liquid pressure on the larger area of the head maintains the valve in its open position. As shown more especially in FIG. 5, the valve 20 includes the spring 21, a number of seal rings 29, valve member 30, a by-pass control push rod 32 and a valve seat 33.

Located below the valve 20 is a reservoir cylinder which contains a cylinder head 22, a piston 23 and a spring 24 by which the piston is biased to its illustrated position. The piston 23 has at its forward end a seal ring 36 and at its rearward end a flange 37 having no seal thus allowing fluid to leak by. Slots 38 may also be provided to assist in the passage of fluid.

In the operation of the mechanism shown in FIG. 6, fluid enters at the inlet 19 and flows into the chamber surrounding the valve 20 and surrounding the piston 23. Valve 20 is held closed by the spring 21 and a very slight hydraulic unbalance as pointed out above. Pressure on the piston 23 moves it against the pressure of the spring 24, forcing within piston 23 through a passage 25 into a chamber 26 which is connected to the outlet 11.

If the outlet circuit is completely filled with fluid and connected to an actuating or other device which offers resistance to the flow of the fluid, the fluid displaced by the piston 23 builds up pressure in the chamber 26 opening the valve 20. Once this valve 20 is opened, it becomes unbalanced and the system pressure holds it open so that operating fluid can flow directly from the inlet 19 through chamber 26 to the outlet 11. This also allows the piston 23 to return to its initial position.

In the event of damage to the outlet or operating line which allows loss of pressure or allows a loss of fluid greater than that displaced by the piston 23, the valve 20 will close and prevent further loss of operating fluid. This is of great advantage where a number of units are operated from the same fluid pressure source in that a damaged unit is automatically isolated and operation of the remaining units is uninterrupted by the loss of operating fluid downstream in a particular unit or units.

To permit bleeding the system of air there is provided a cam 27 which is rotatable by means of the handle 17 and operates through a plunger or push rod 32 to open the valve 20 against the pressure of the spring 21. In addition to providing a means to bleed the system of air, the control elements can be utilized to provide manual emergency over-ride on the stop valve in the event a leak occurs in the outlet system, which causes a loss of fluid greater than the capacity of the reservoir cylinder, but not great enough to prevent temporary operation of the operated device.

I claim:

1. In a hydraulic fuse apparatus, the combination with a housing of a pair of generally parallel laterally spaced slide valve members therein, respective seats for said valve members, an inlet passageway between said members on an inlet side of said seats for supplying liquid to around the outside of each valve member, an outlet passageway communicatively interconnecting the outlet side of said seats, one of said valve members being stepped with an enlarged end adjacent its seat and being normally closed when not in operation, the other end of said one valve member being vented to relatively low pressure and sealed from said inlet, a spring engaging said housing and said enlarged end portion for slightly biasing said one valve member to a closed position when fluid pressure on the outlet side of its seat falls below a predetermined delivery fluid pressure, the other valve member of said pair being of a hollow cylindrical piston type having a closed end remote from its seat and a guide flange capable of leaking liquid past said closed end for applying pressure from said inlet passageway to move said piston type valve toward its seat and discharge liquid within it into said outlet passageway, and a spring engaging said housing and said piston type valve for biasing said piston type valve member to an open position away from said outlet passageway, the relative strengths of said valve member springs being such that on initial application of inlet pressure to both of said valve members said first mentioned valve member stays closed and the piston type valve member is moved toward said outlet passageway, applying additional pressure to liquid in said outlet passageway for opening said first valve member and holding it open as liquid from said inlet passageway moves around said first valve member and into said outlet passageway without passing through or around said piston type member, said piston type valve member being returned to its initial position adjacent said inlet passageway under influence of its spring, and said first mentioned valve member being returned to its seated or closed position in response to substantial reduction of fluid pressure in said outlet passageway.

2. A combination according to claim 1 in which a cam and a push rod actuated thereby are provided for opening said first mentioned valve member for removal of air within said apparatus.

References Cited by the Examiner
UNITED STATES PATENTS

| 2,272,091 | 2/42 | Loewe | 137—494 X |
| 2,428,150 | 9/47 | Field | 137—494 X |
| 2,478,210 | 8/49 | Sprague et al. | 137—494 X |

M. CARY NELSON, *Primary Examiner.*

MARTIN P. SCHWADRON, LAVERNE D. GEIGER,
*Examiners.*